(12) United States Patent
Cherepov et al.

(10) Patent No.: US 8,806,629 B1
(45) Date of Patent: Aug. 12, 2014

(54) AUTOMATIC GENERATION OF POLICY-DRIVEN ANTI-MALWARE SIGNATURES AND MITIGATION OF DOS (DENIAL-OF-SERVICE) ATTACKS

(75) Inventors: Mikhail Cherepov, Lexington, MA (US); Andrew Zawadowskiy, Hollis, NH (US); Jeffrey Albin Kraemer, Wellesley, MA (US); Boris Ruchansky, Wayland, MA (US)

(73) Assignee: Cisco Technology, Inc., San Jose, CA (US)

(\*) Notice: Subject to any disclaimer, the term of this patent is extended or adjusted under 35 U.S.C. 154(b) by 1599 days.

(21) Appl. No.: 11/968,488

(22) Filed: Jan. 2, 2008

(51) Int. Cl.
*G06F 12/14* (2006.01)

(52) U.S. Cl.
USPC ............................................. 726/23; 726/25

(58) Field of Classification Search
CPC . H04L 63/1416; H04L 63/1441; H04L 63/14; H04L 63/145; G06F 21/56
USPC ........................................................ 726/22–25
See application file for complete search history.

(56) References Cited

U.S. PATENT DOCUMENTS

| | | | |
|---|---|---|---|
| 6,381,242 B1* | 4/2002 | Maher et al. | 370/394 |
| 6,775,780 B1* | 8/2004 | Muttik | 726/24 |
| 2002/0129140 A1* | 9/2002 | Peled et al. | 709/224 |
| 2002/0166063 A1* | 11/2002 | Lachman et al. | 713/200 |
| 2003/0110393 A1* | 6/2003 | Brock et al. | 713/200 |
| 2003/0145225 A1* | 7/2003 | Bruton et al. | 713/201 |
| 2005/0022018 A1* | 1/2005 | Szor | 713/201 |
| 2006/0259967 A1* | 11/2006 | Thomas et al. | 726/22 |
| 2007/0143847 A1* | 6/2007 | Kraemer et al. | 726/23 |
| 2007/0143851 A1* | 6/2007 | Nicodemus et al. | 726/25 |
| 2008/0016570 A1* | 1/2008 | Capalik | 726/23 |
| 2008/0140662 A1* | 6/2008 | Pandya | 707/6 |

OTHER PUBLICATIONS

Integrating Cisco Security Agent with Cisco Intrusion Prevention System http://www.cisco.com/en/US/prod/collateral/vpndevc/ps5729/ps5713/ps4077/prod_white_paper0900aecd805c389a.pdf. Last accessed Aug. 8, 2008, 18 pages.

Botwicz, et al. 'Building Dependable Intrusion Prevention Systems'. In : International Conference on Dependability of Computer Systems, 2006. DepCos-RELCOMEX apos;May 6, 2006, pp. 135-142. 0-7695-2565-2/06 IEEE. http://ieeexplore.ieee.org/iel5/4024017/4024018/04024042.pdf?tp=&arnumber=4024042&isnumber=4024018. Last accessed Aug. 8, 2008.

Network Intrusion Prevention Systems Justification and ROI, White Paper, Oct. 2004. http://www.mcafee.com/us/local_content/white_papers/wp_nps_justification_roi.pdf. Last accessed Aug. 8, 2008, 5 pages.

\* cited by examiner

*Primary Examiner* — Harunur Rashid
(74) *Attorney, Agent, or Firm* — Schwegman Lundberg & Woessner, P.A.

(57) ABSTRACT

A system and method for specification of a policy to trigger automatic signature generation, refinement, and confidence characterization is provided. The system monitors incoming payloads and identifies untrusted payloads based on specified characteristics of the process including process name, triggering action, prior actions and/or state and/or conditions. Signatures are automatically generated for untrusted payloads and stored. Additionally, the system enables denial-of-service (DoS) protection based on the number of signature-generation attempts that allows the server process to continue providing service on unaffected interfaces.

14 Claims, 14 Drawing Sheets

1202

1204

AUTOMATIC GENERATION OF POLICY-DRIVEN ANTI-MALWARE SIGNATURES AND MITIGATION OF DOS (DENIAL-OF-SERVICE) ATTACKS

TECHNICAL FIELD

The subject disclosure relates generally to network and host-based intrusion prevention systems and in particular to policy-driven automatic signature generation, refinement and confidence characterization.

BACKGROUND

An increase in malicious attacks on networks gives rise to various challenges to ensure secure and effective communication between devices in a network. With increase in the number of devices and access points on the network, comprehensive security strategies now require defense-in-depth, with security layered across the network, the server, and the endpoints. Typically, intrusion prevention systems can be employed to monitor a network for malicious or unwanted activity and can react, in real-time, to block, deny or prevent those activities.

Intrusion prevention systems, typically, network based or host based, employ automatically generated signatures to detect malicious attacks. Generally, conventional systems automatically generate anti-malware signatures by employing threat detection engines driven by built-in assumptions to trigger auto-generation of signatures.

Conventional detection methods can provide several tunable numeric variables, for example, allowing one to specify network flow types and pattern prevalence measures to generate its invariants (signatures), and/or employing dynamic dataflow analysis and non-executable pages, and/or intercepting memory violations. Thus, the conventional methods for threat detection tend to be built into the product or tunable with parameter sets.

Traditional systems, however, face two main obstacles during malware detection, namely, false positives and the lack of fidelity metrics for signatures. Users do not have control during signature generation and if a signature is generated badly, it can match legitimate traffic leading to errors and corrupted data. Automatic generation of signatures is fraught with false positives to a much greater extent than manual generation of signatures. However, manual generation or a manual check after automatic generation of signatures is unreliable, prone to human errors and time consuming. Furthermore, conventional systems that provide automatic generation of signatures fail to provide a measure of confidence for a signature and cannot enable deployment based on the confidence.

A related problem is denial-of-service attacks with highly polymorphic code where the purpose of the attacker is either to crash the system, or to guess a vulnerable address to exploit. In this case, conventional security systems are unable to generate a signature to stop all possible malicious payloads. They fail to identify a vulnerable interface and restrict/control access to it, while still providing full service on other interfaces. The problems associated with malware detection by automatic signature generation have potentially catastrophic effects that can inflict substantial losses on an organization or individual.

DESCRIPTION

Overview

Figure 1:
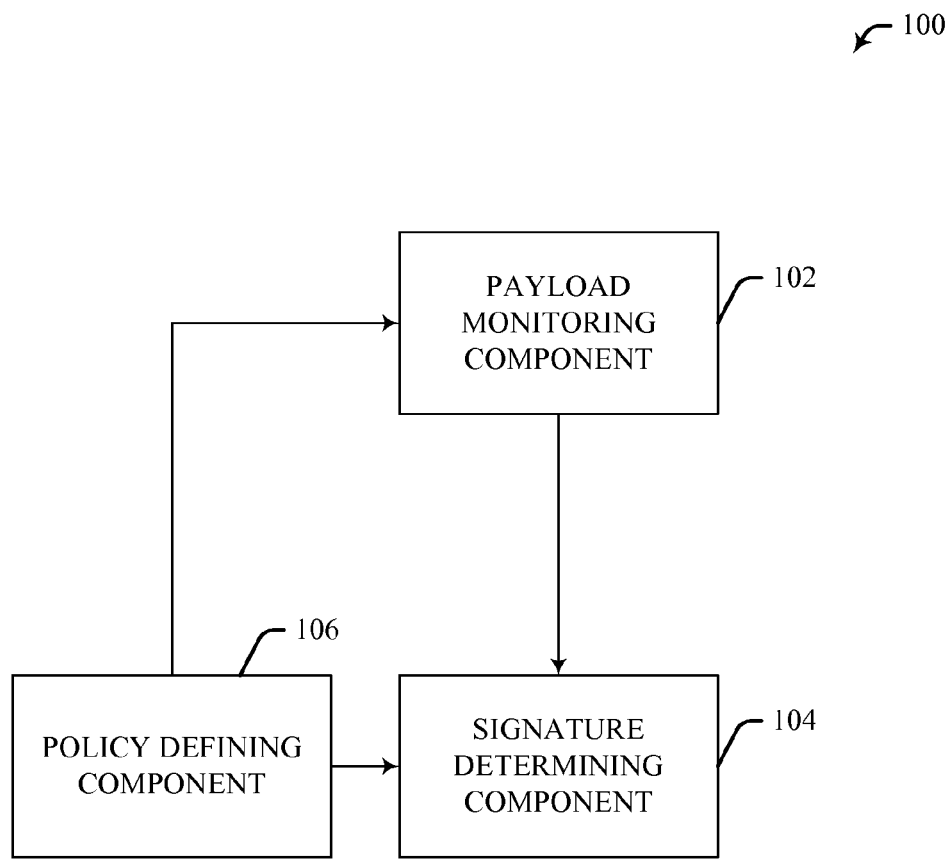
FIG. 1 illustrates a block diagram of an example system that facilitates automatic signature generation based on a specified policy.

The following presents a simplified overview of the claimed subject matter in order to provide a basic understanding of some embodiments described herein. This is not an extensive overview of the claimed subject matter. It is intended to neither identify key or critical elements of the claimed subject matter nor to delineate the scope of that subject matter. Its sole purpose is to present some concepts of the claimed subject matter in a simplified form as a prelude to the more detailed description of example embodiments that is presented later.

The system disclosed and claimed herein, in one aspect thereof, specifies a policy to trigger automatic signature generation, refinement, and confidence characterization. A policy rule sets payload characteristics based on user-specified characteristics of the process including process name, triggering action, prior actions and/or state and/or conditions. Furthermore, the system provides signature-generation/refinement policy specification with an unprecedented degree of discrimination and control and prevents false positives by enabling a user to manage signature generation via fine-grained policies. According to an aspect, the system provides policy-driven signature confidence generation based on the full power of a signature-determining rules component to consider various parameters, such as, process's history, type of action, application design, etc.

According to another aspect of the system, a payload monitoring component monitors incoming payloads and detects events that trigger a process of signature generation (e.g. Buffer overflow, Exception, etc.). The payload monitoring component performs interception and reports payloads for violations. Furthermore, it collects payload data (if available) and other context information and reports to a signature-determining rules component with an appropriate request type. Additionally, the payload monitoring component can filter incoming payloads by matching them with previously generated signatures.

In accordance with another aspect of the specification, a policy defining component allows a user to specify a set of rules for automatic signature generation as well as rules for filtering incoming payloads employing the generated signatures. The user specifies a policy for signature generation events based on a variety of application characteristics, such as, program name, action to trigger generation, attempts to launch processes, access files, establish network connections, and/or prior actions including files touched, processes launched, network connections opened, etc. Machine learning techniques can also be employed to determine a policy based on a user's previous choices.

Another aspect of the claimed subject matter relates to a system for policy-driven signature generation and management that includes a signature-determining rules component, which receives a rule request and determines what is to be done with the associated payload. If the rule request matches specified rules, the signature-determining rules component propagates data to the signature generation component. According to an aspect of the system, a signature generation component performs actual signature generation as requested by the signature-determining rules component. The generated signature is verified and stored in a database and/or distributed.

Yet another aspect of the subject specification describes a system and method for prevention of Denial-of-Service (DoS) attacks based on the number of signature-generation attempts. When the system attempts signature generation with a frequency exceeding user-specified threshold for a certain protocol/interface, DoS protection is enabled. DoS protection allows the server process to continue providing service on unaffected interfaces.

The following description and the annexed drawings set forth in detail certain illustrative embodiments of the claimed subject matter. These embodiments may be indicative, however, of but a few of the various ways in which the principles of the claimed subject matter may be employed and the claimed subject matter is intended to include many and/or all such embodiments and their equivalents. Other advantages and novel features of the claimed subject matter will become apparent from the following description of example embodiments when considered in conjunction with the drawings.

Description of Example Embodiments

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

As used in this application, the terms "component", "system", "interface", or the like are generally intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers. As another example, an interface can include I/O components as well as associated processor, application, and/or API components.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

While certain ways of displaying information to users are shown and described with respect to certain figures as screenshots, those skilled in the relevant art will recognize that various other alternatives can be employed. The terms "screen," "web page," and "page" are generally used interchangeably herein. The pages or screens are stored and/or transmitted as display descriptions, as graphical user interfaces, or by other methods of depicting information on a screen (whether personal computer, PDA, mobile telephone, or other suitable device, for example) where the layout and information or content to be displayed on the page is stored in memory, database, or another storage facility.

Referring initially to the drawings, FIG. 1 illustrates an example system 100 that can facilitate automatic signature generation based on a specified policy. The system 100 can employ a specified policy, to limit signature generation to cases such that false positives are likely to be low. Furthermore, system 100 can facilitate automatic generation of signatures to stop worm propagation and mitigate Denial-of-Service (DoS) attacks.

System 100 can typically include a payload monitoring component 102 that can monitor and/or track incoming payloads. Generally, the payload monitoring component 102 can match the incoming payload data with signatures to identify malware. Furthermore, the payload monitoring component 102 can also detect events that trigger automatic generation of a signature, for example the payload monitoring component 102 can detect occurrence of a buffer overflow and/or an exception. If an event that triggers the process of automatic signature generation is detected, the payload monitoring component 102 can collect payload data (if available) and other context information associated with the incoming payload and report to a signature determining component 104 with an appropriate request type.

The signature determining component 104 can automatically generate and verify a signature for the payload in consideration based on a specified policy, such as a set of rules. The policy can be specified by a user employing the policy defining component 106. The policy defining component 106 can determine a policy for automatic signature generation as well as for filtering incoming traffic with the generated signature. The policy defining component 106 can employ a user input via a user interface and/or employ machine learning techniques to specify a policy.

The signature determining component 104 can determine if the payload is considered trusted or untrusted based on the specified policy. Typically, the signature determining component 104 can employ the policy defined by the policy defining component 106 to generate a signature associated with the untrusted payload. The signature generated can be verified and/or stored in a database (not shown).

Figure 2:
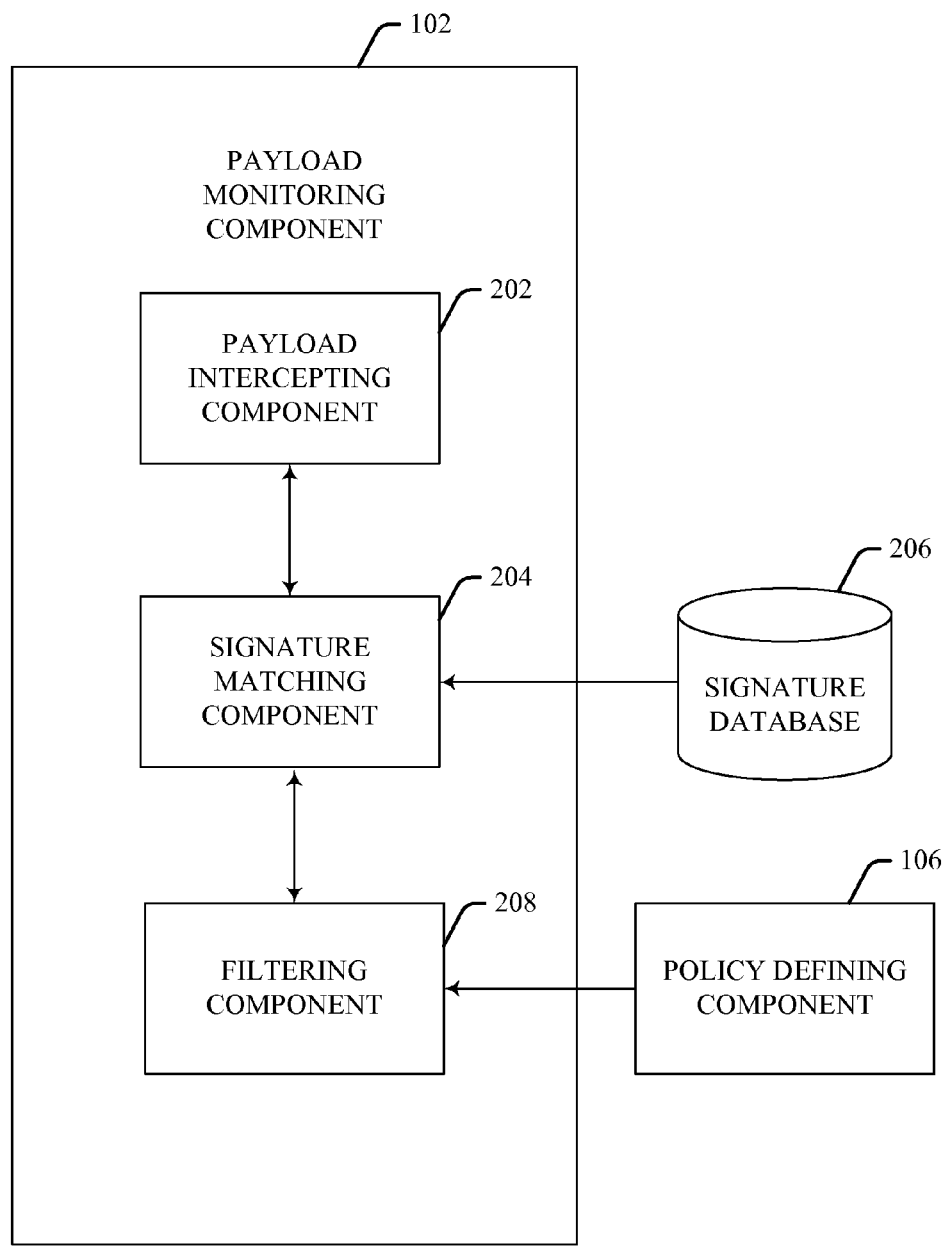
FIG. 2 illustrates a schematic block diagram of an example system that monitors incoming payloads in accordance with an aspect of the specification.

Referring now to FIG. 2, there illustrated is an example payload monitoring component 102 that monitors incoming payloads in accordance with an aspect of the specification. As an example, a payload can be most any data that is believed to cause a security violation such as a buffer overflow, an exception or the like, while processing such data by the code executing in a particular thread. Thus, payload data may correspond in some cases to packets on the wire but in most cases can be multiple packets combined in application layer payload. A payload can be legitimate and the payload monitoring component 102 can be employed to distinguish benign from malicious payloads.

The payload monitoring component 102 can include a payload intercepting component 202 that can perform interception and report incoming payloads for violations. During interception, the payload intercepting component 202 can identify one or more events that trigger the process of signature generation. The payload intercepting component 202 can collect payload data (if available) and other context information. The data and/or information associated with the payload can be sent to a signature-determining rules component (not shown) with a proper request type.

Generally, the payload intercepting component 202 can hook an appropriate function to obtain an attack payload at the time when an event of interest triggers a rule during an attack, for example buffer overflow while processing an RPC (remote procedure call) packet. Additionally, stack information can be saved by the payload intercepting component 202 and can be employed to perform stack unwind at the time of event of interest.

The payload monitoring component 102 can also include a signature matching component 204 that matches signature against incoming payload data. The signature matching component 204 can match signatures generated for particular interface against incoming packets in efficient manner. When a payload matches a signature, a request can be made to a filtering component 208 asking for policy decision on what to do with the matched packet. Depending on response of the filtering component 208, the matching packet is either denied or allowed.

Actual matching of signature against incoming packet can be performed by employing most any matching algorithm, such as, a linear time algorithm, Aho-Corasik algorithm, etc. The signature matching component 204 employs signatures stored in signature database 206 that contains one or more signatures generated by a specified policy. The signature database 206 can provide storage of signatures, exchange of signatures and/or versioning of signatures. It can also provide a programming interface to query signatures with a given tag. The signature database 206 can store most any packets used for a particular signature generation along with the signature since the signature could be in a "non final" state wherein information associated with it is still being learned.

Typically, the filtering component 208 can apply a generated signature along with a specified filtering rule to identify malware. The filtering rule can be determined by the policy defining component 106. Based at least in part on the filtering rule, the filtering component 208 can stop worm propagation and/or other exploits by filtering the incoming payloads. The payload intercepting component 202 can cooperate with the filtering component 208 to implement filtering of payloads, by knowing which payloads to allow and which to send for filtering. In certain cases, a non-signature-matching payload can also be provided to the filtering component 208, such as during the detection of DoS attacks. Interface-disabling, total or partial, can be implemented for DoS protection, and malicious traffic can be dropped while still permitting known-good traffic.

Figure 3:
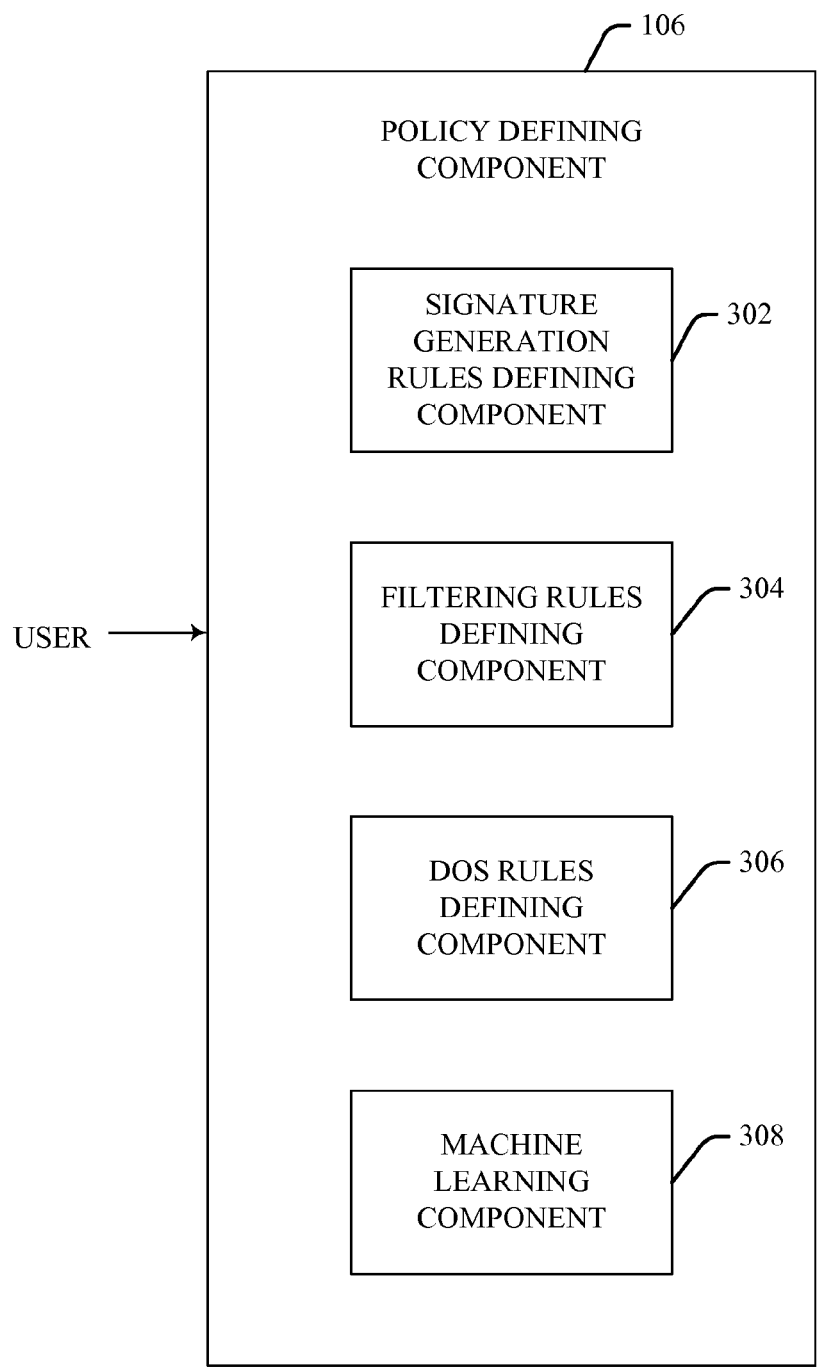
FIG. 3 illustrates an example system that specifies a policy to trigger automatic signature generation, refinement, and confidence characterization, according to an aspect of the system.

Referring to FIG. 3, there illustrated is an example policy defining component 106 that specifies a policy to trigger automatic signature generation, refinement, and confidence characterization, according to an aspect of the system. The policy defining component 106 can provide an ability to trigger automatic signature generation and refinement with unprecedented degree of control. By tying the generation to configurable policy, the system can limit generation to cases where false positives are likely to be low. Additionally, the policy defining component 106 can automatically specify a confidence rating of a signature based upon a configured "triggering policy".

The policy defining component 106 can consider various factors of a signature's confidence, such as, the strength of a symptom of attack (e.g., a detected buffer overflow in a network server may be a stronger symptom than a mere attempt by the server to make an unusual system call), and/or the certainty about which payload has caused the symptom, for example, an incoming payload seen by the CSA hooking code in thread A may cause a buffer overflow in the same thread A, or in some worker thread B. The confidence of the signature from the first (same-thread) case would be higher because the system is certain which payload has caused the buffer overflow. Another example is signatures for URI (Universal Resource Identifier) exploits such as, for an Apache web server, the system can determine exactly which URI has caused a buffer overflow, whereas for the IIS (Internet Information Services) web server, the system can merely narrow the suspects to several payloads, this would mean the higher confidence for the Apache-derived URI signature than for the IIS-derived one can be employed.

Referring back to FIG. 3, the policy defining component 106 can typically include a signature generation rules defining component 302 wherein a user can specify a policy for automatic signature generation events, and a filtering rules defining component 304 wherein a user can specify a policy for filtering associated with the generated signatures. The user can define a policy based on various characteristics of an application, such as a program name (syntax with wildcards and/or exceptions), an action to trigger generation (including, but not limited to, buffer overflows, thrown exceptions), attempts to launch processes, access files, establish network connections, etc., prior actions including files touched, processes launched, network connections opened, etc.

Generally, policy specification for signature generation (by signature generation rules defining component 302) can be defined as a new policy rule type for an application class X to set a payload state when a specified event happens, such as, but not limited to, a buffer overflow or an exception matching certain matters. As an example, if a user wishes to set the incoming payload's state to untrusted when a buffer overflow occurs, the user can specify the policy as, for lsass.exe: set the Payload State to untrusted on a buffer overflow. The policies can be written such that an exception or buffer overflow usually signifies a malware attack. The payload state may be set to untrusted, which means that the signature determination component 104 (FIG. 1) can generate a signature matching this payload. A payload can be marked as trusted, which would imply that a signature is not generated for it.

Typically, a DoS rules defining component 306 can also be included in the policy defining component 106. The DoS rules defining component 306 can allow a user to specify a policy such that DoS attacks are mitigated. As an example, the policy can specify a maximum threshold for signature generation attempts. Additionally, the policy can also specify a special category for the problematic protocol/interface such that malicious traffic can be dropped into this category.

The policy defining component 106 can also employs a machine learning component 308, which can facilitate automating one or more features in accordance with the subject innovation. The subject innovation (e.g., in connection with policy determination) can employ various AI-based (artificial intelligence-based) schemes for carrying out various aspects thereof. For example, a process for determining when the incoming payload can be identified as trusted or untrusted can be facilitated via an automatic classifier system and process.

A classifier is a function that maps an input attribute vector, $x=(x1, x2, x3, x4, xn)$, to a confidence that the input belongs to a class, that is, $f(x, \alpha, \ldots, \omega)$=confidence (class). As an example, $\alpha, \ldots \omega$ can be additional considerations related to the process state, rule engine-observed contemporaneous events, etc. Such classification can employ a probabilistic and/or statistical-based analysis (e.g., factoring into the analysis utilities and costs) to prognose or infer an action that a user desires to be automatically performed. In the case of anti-malware systems, for example, attributes can be words or phrases or other data-specific attributes derived from the words (e.g., database tables, the presence of key terms), and the classes can be categories or areas of interest.

A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject innovation can employ classifiers that are explicitly trained (e.g., via a generic training data) as well as implicitly trained (e.g., via observing user behavior, receiving extrinsic information). The purpose of the training is to validate auto-signatures, i.e., discard or modify ones that match normal traffic, and not to create signatures that match normal traffic. For example, SVM's are configured via a learning or training phase within a classifier constructor and feature selection module. Thus, the classifier(s) can be used to automatically learn and perform a number of functions, including but not limited to determining according to a predetermined criteria.

Figure 4:
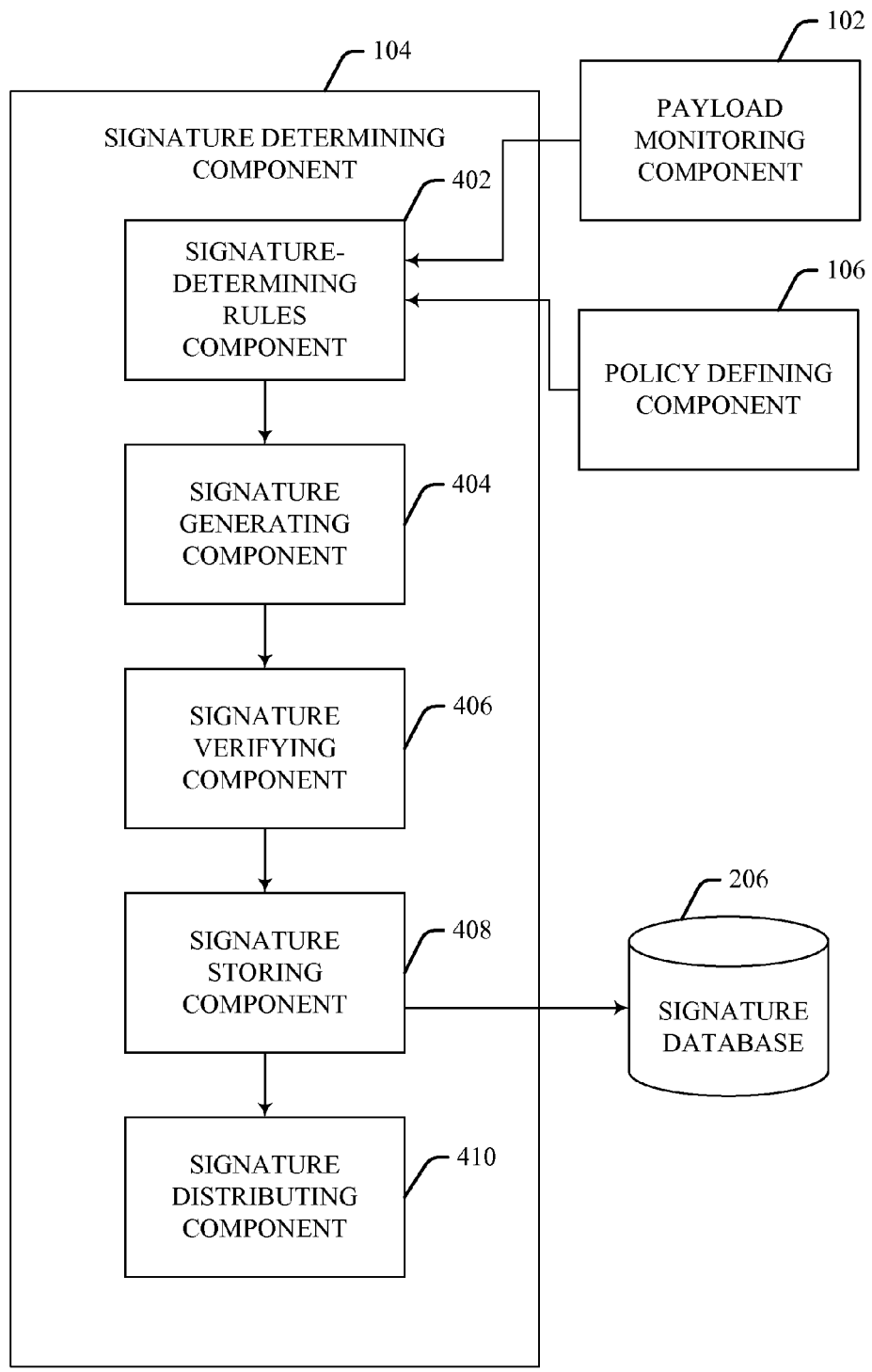
FIG. 4 illustrates an example system that facilitates automatic generation of a signature associated with a payload, based on a policy.

Referring now to FIG. 4 that illustrates an example signature determining component 104 that facilitates automatic generation and management of a signature associated with a payload, based on a specified policy. Typically, the signature determining component 104 can interact with a signature-determining rules component 402 that can determine the actions to be performed on the received payload depending on the policy specified. Furthermore, it can be appreciated that functionality of the signature determining component 104, as discussed below, may reside on one or more machines.

The signature-determining rules component 402 can check the specified policy and determine actions to take per-payload on signature match. If the payload matches proper rules, the signature-determining rules component 402 can propagate payload data to a signature generation component 404. Signature-determining rules component 402 can receive a rule request from the payload monitoring component 102 involving a payload and can compare the rule request to a specified policy, including, but not limited to, a set-payload-untrusted rule, a set-payload-trusted rule, or some combination thereof. If a request matches a set-payload-trusted rule, the payload can be considered trusted, and no signature will be generated from it. Else, if the payload triggers the set-payload-untrusted rule, the signature-determining rules component 402 can request the offending payload. The signature-determining rules component 402 obtains the offending payload and forwards it to the signature generating component 404.

Typically, the signature-determining rules component 402 can be employed to attach metadata to a generated signature. The signature metadata can include, but is not limited to, a determined confidence metric associated with the signature. As an example, the confidence metric could be set as high, low or medium based on the number of payloads that caused the signature generation. Additionally, the metadata can be employed to facilitate identification and separation of an individual attack from all others.

The signature generating component 404 performs actual signature generation for input payloads as requested by the signature-determining rules component 402 based on user-defined (provided by the policy defining component 106) and/or built-in policies. Typically, a signature can be a longest ordered sequence of substrings which given input payloads produce. Such a signature can match every payload that was used for its generation. Most any signature generation algorithm can be employed to generate the signature, such as, but not limited to, Longest Common Token Subsequence Signature (LCTS) algorithm, Distinct Common Substrings Signature (DCSS) algorithm, Longest Common Substring (LCS) algorithm etc. Furthermore, the signature generating component 404 can combine a new attack payload (that has triggered regeneration) with old payloads already in the signature database 206 to produce a new and/or updated signature.

Generally, the generated signature can then be verified by a signature verifying component 406. The signature verifying component 406 can verify the generated signature, wherein verification can include, but is not limited to, checking for size, checking for a false-negative match against known-good requests, etc. The signature verifying component 406 can apply each check per generated signature (e.g. total signature size must be no less then X, etc.) and can return a response accordingly. Once verified, the generated signature can be sent to a signature storing component 408.

The signature storing component 408 can store the verified signatures into a signature database 206. Furthermore, the signature storing component 408 can also store attack payloads along with the new or regenerated signatures to the signature database 206 for permanent storage. The database 206 can store the information in most any format, for example, a binary file format with a simple flat sequential-record structure. The database 206 can be local, remote and/or distributed and/or shared and can be implemented as several files. As an example, a file can be employed for local signatures, global signatures, combined signatures, incoming attack payloads (captured and stored quickly lest they should be lost in a system crash), attack payloads for storage and/or signature refinement, etc. The files can be protected by most any protection logic and/or can be encrypted. When the files are updated, the current files can be renamed to temporary names, new files can be created in their place, and then temporary files can be deleted. A user can query signatures in the signature database 206 via a programming interface.

A signature distributing component 410 can be employed to send new or updated signatures to disparate host systems. The signature distributing component 410 can determine if and/or when a host needs to be notified about a new and/or refined signature. The signature distributing component 410 can accordingly deliver signatures to their destinations.

Figure 5:
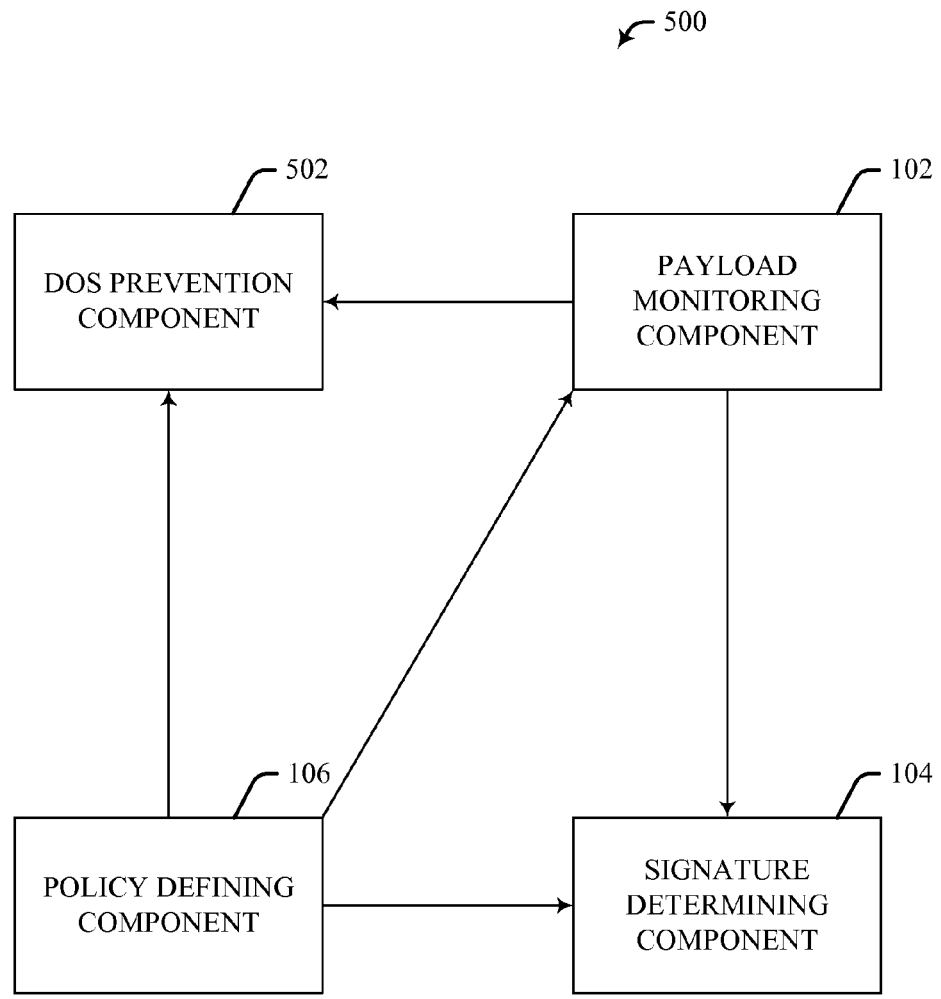
FIG. 5 illustrates an example system that prevents of Denial-of-Service (DoS) attacks based on the number of signature generation attempts in accordance with an aspect of the innovation.

FIG. 5 illustrates an example system 500 that prevents of Denial-of-Service (DoS) attacks in accordance with an aspect of the innovation. DoS attacks with highly polymorphic code are attacks wherein an attacker attempts to either crash the system, or guess a vulnerable address to exploit. In this case conventional security software is unable to generate a signature to stop all possible malicious payloads; however, the system 500 can typically include a DoS prevention component 502 that can mitigate such attacks based on a policy defined by the policy defining component 106. The DoS prevention component 502 can identify the vulnerable interface and restrict/control access to it, while still providing full service on other interfaces.

Generally, the DoS prevention component 502 can protect the system against DoS attacks by counting the number of signature-generation attempts. When the signature determining component 104 attempts signature generation with frequency exceeding user-specified threshold for a certain protocol/interface, the DoS prevention component 502 can determine a special category for the problematic protocol/interface (for example called, @dynamic_interface). This can allow a policy to drop malicious traffic while permitting known-good traffic to such a category selectively (e.g., from certain IP addresses), and can allow the server process to continue providing full service on unaffected interfaces. Furthermore, the DoS prevention component 502 can also take into account signature generation request confidence.

The DoS prevention component 502 can enable DoS protection based on policy-specified signature generation and signature confidence. Typically, the DoS prevention component 502 can identify and limit access to vulnerable interfaces selectively thereby allowing service to continue on unaffected interfaces.

Figure 6:
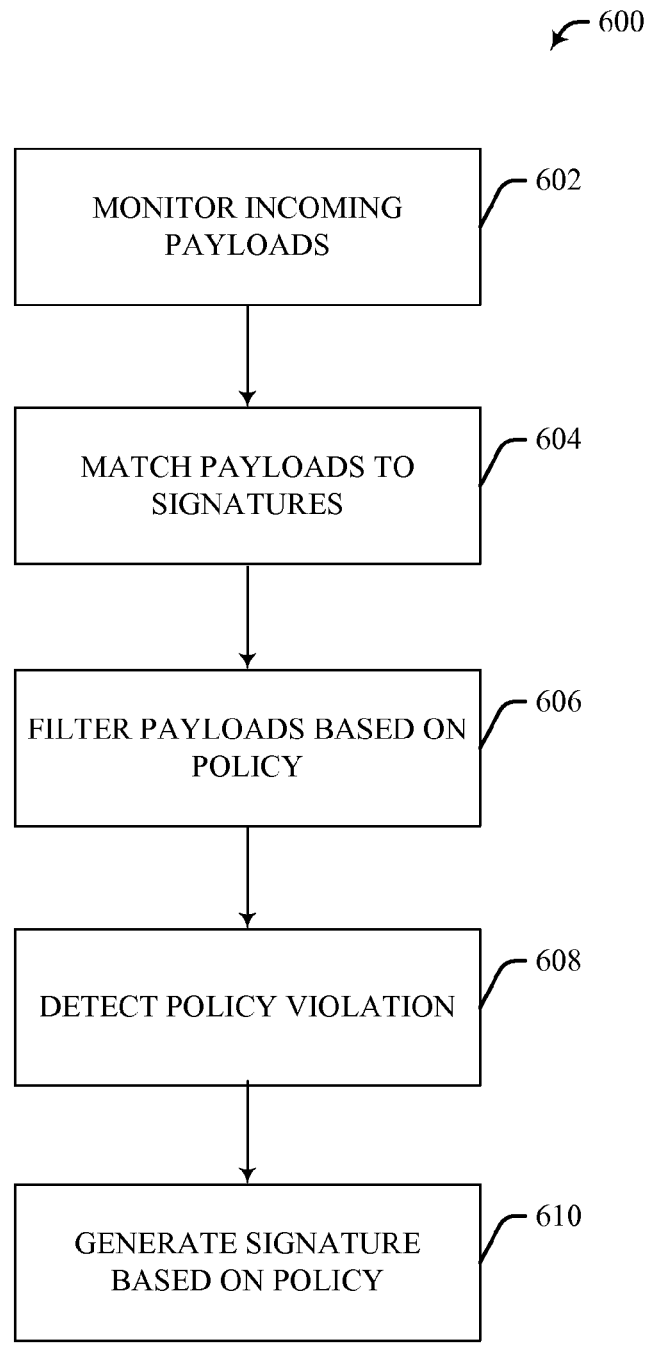
FIG. 6 illustrates an exemplary flow chart of procedures that facilitate determination of a rule request associated with a payload in accordance with an aspect of the innovation.

FIG. 6 illustrates a methodology 600 that can determine a rule request associated with a payload in accordance with an aspect of the innovation. While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

Referring back to FIG. 6, an incoming payload can be monitored at 602. The incoming payload can be intercepted and reported for violations, if any. Typically, the incoming payload data can be matched with previously generated signatures at 604 by employing a matching algorithm. When a signature is matched, it can then be determined if the incoming payload can be dropped or allowed. Furthermore, incoming payloads can be filtered based on a specified policy at 606.

A policy violation for an allowed payload can be detected at 608. If an event that violates a specified policy is detected, payload data (if available) and other context information associated with the incoming payload can be collected and request can be made to automatically generate a signature for the payload at 610.

Figure 7:
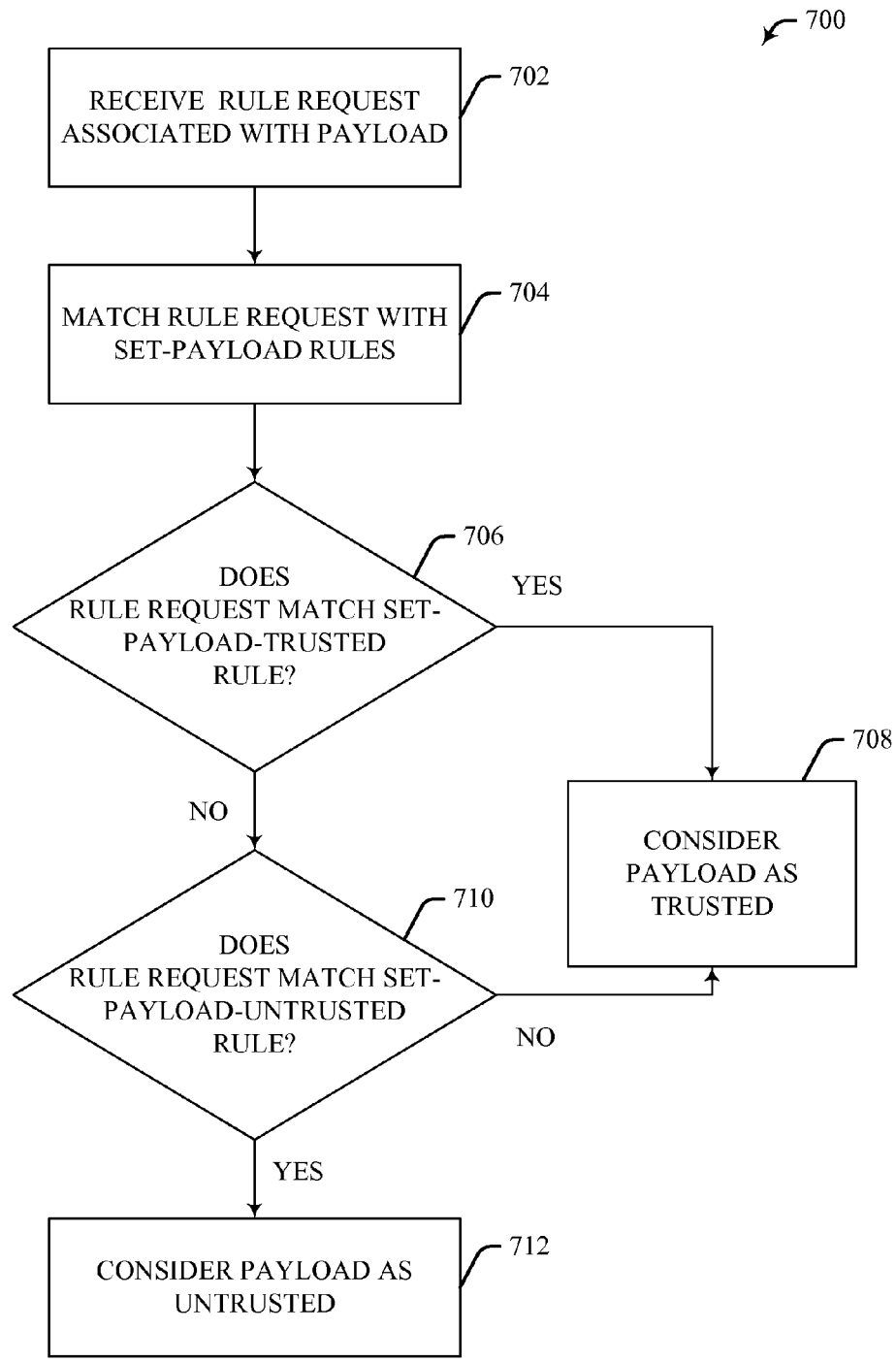
FIG. 7 illustrates an exemplary flow chart of procedures that facilitate identification of trusted and untrusted payloads according to an aspect of the innovation.

FIG. 7 illustrates a methodology 700 that can determine the actions to be performed on the received payload based on a specified policy according to an aspect of the innovation. Typically, methodology 700 can identify trusted and untrusted payloads based on a specified policy. A rule request involving a payload can be received at 702. The rule request can be compared to a specified policy at 704 that can include a set-payload-untrusted rule, a set-payload-trusted rule, or some combination thereof. Detection of policy violation by a payload presupposes that the payload has been allowed by filtering.

The actions taken per-payload on a signature match can be determined based on the specified policy. The rule request can be matched with a set-payload-trusted rule specified in the policy, as shown by decision box 706. If the rule request matches the set-payload-trusted rule, the payload can be considered trusted at 708, and no signature will be generated from it. Similarly, the rule request can be matched with a set-payload-untrusted rule specified in the policy, as shown by decision box 710. If the rule request matches the set-payload-untrusted rule, the payload can be considered untrusted at 712. The untrusted payload can be obtained and its signature can be generated. However, if the rule request does not match the set-payload-untrusted rule, the payload can be considered trusted at 708.

Figure 8:
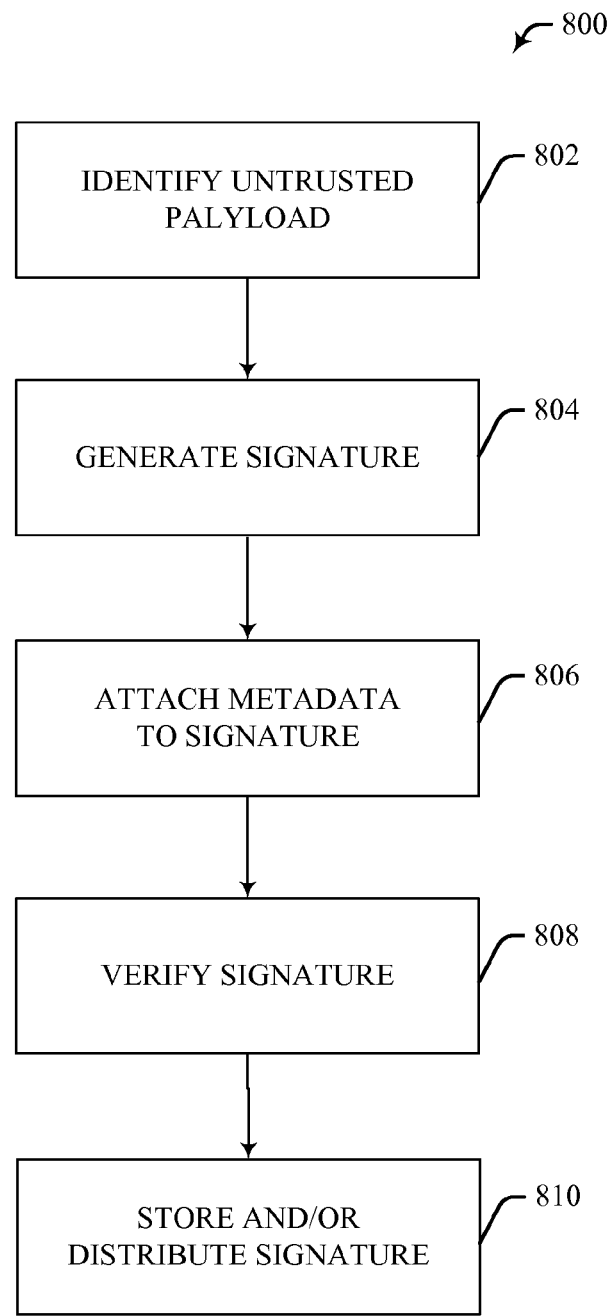
FIG. 8 illustrates an exemplary flow chart of procedures that facilitate policy-driven automatic signature generation in accordance with an aspect of the innovation.

Referring now to FIG. 8, there illustrated is a methodology that can facilitate policy-driven automatic signature generation in accordance with an aspect of the innovation. As shown in the figure, an untrusted payload can be identified at 802 when a rule request associated with the payload matches a set-payload-untrusted rule defined by a policy.

A signature can be generated for the untrusted payload at 804. Most any signature generation algorithm can be employed to generate the signature, for example, LCTS algorithm, DCSS algorithm, LCS algorithm etc. Additionally, a new attack payload (that has triggered regeneration) can be combined with old payloads to generate a new signature. Metadata can be attached to the generated signature at 806. The metadata can include a confidence metric associated with the signature.

The newly generated signature can further be verified at 808. Verification of the generated signature can include checking for size, checking for a false-negative match against known-good requests, etc. After the checks have been applied to the generated signature a response can be returned and the verified signatures can be stored and/or distributed at 810. Furthermore, the attack payload associated with the signature can also be stored. Generally, a user can query the stored signatures via a programming interface.

Figure 9:
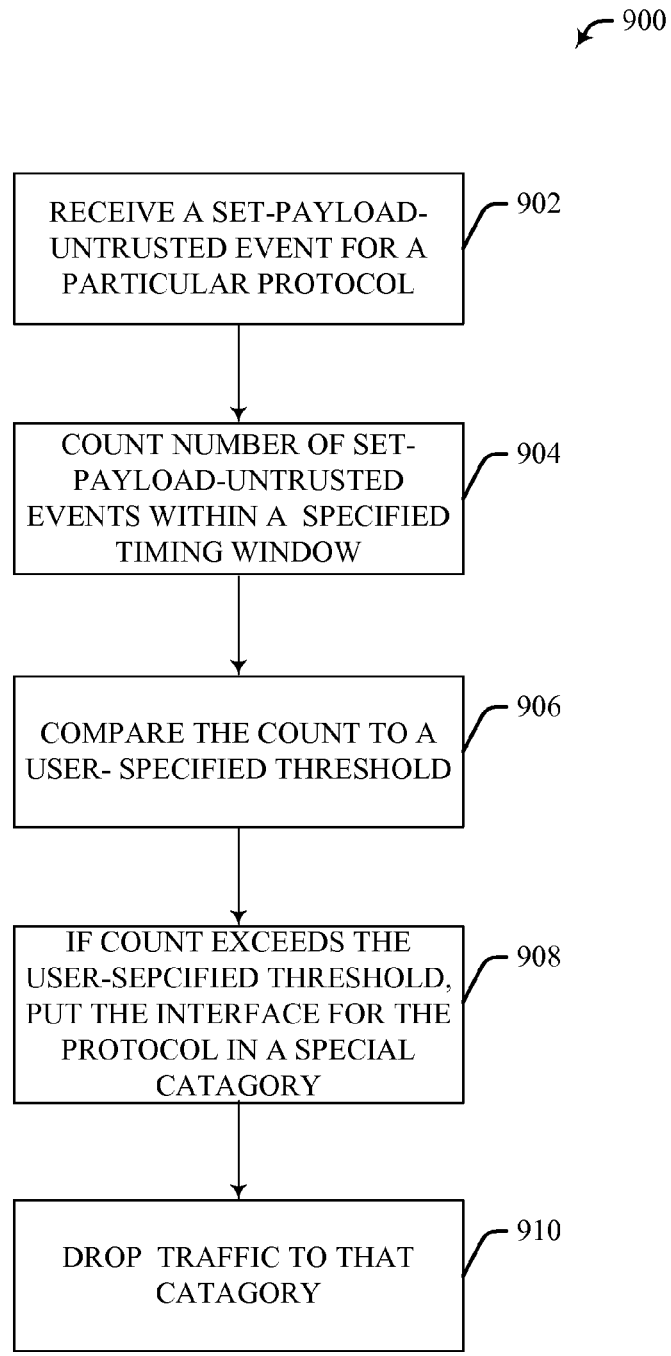
FIG. 9 illustrates an exemplary flow chart of procedures that facilitate prevention of DoS attacks in accordance with an aspect of the innovation.

Referring to FIG. 9, there illustrated is a methodology 900 that can prevent Denial-of-Service (DoS) attacks in accordance with an aspect of the innovation. The methodology 900 can identify a vulnerable interface and restrict/control access to it, while still providing full service on other interfaces.

A set-payload-untrusted event for a particular protocol can be received at 902. Typically, if a rule request associated with a payload matches a set-payload-untrusted rule defined by a policy, the payload can be considered as untrusted. The number of set-payload-untrusted events identified during a specified timing window can be counted at 904 and compared to a user-specified threshold at 906. If the number exceeds the user-specified threshold, the interface for the protocol can be classified as a special category at 908. Generally, malicious traffic can be dropped while still permitting known-good traffic to such a category selectively at 910, and the server process can continue to provide service on unaffected interfaces.

Figure 10:
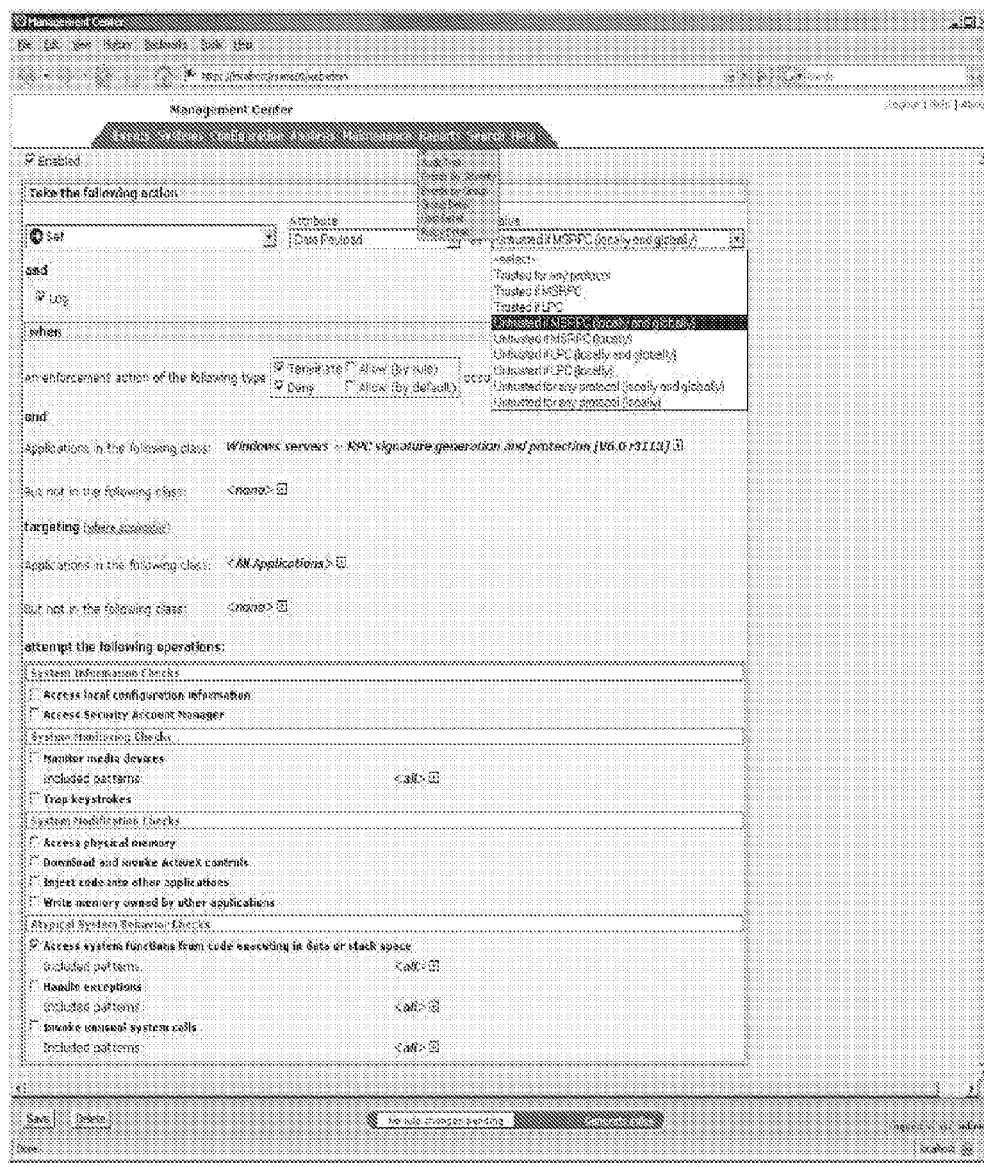
FIG. 10 illustrates an example GUI (Graphical User Interface) that enables a user to specify a signature generation policy rule according to an aspect of the specification.

FIG. 10 illustrates an example screenshot 1000 of a GUI (Graphical User Interface) that can enable a user to specify a signature generation policy rule, in accordance with an aspect of the innovation. A user can employ a programming interface, such as that shown in FIG. 10, to define a policy that can prevent false positives. The user can specify a set of rules for signature generation events based on a variety of application's characteristics including, but not limited to, a program name (syntax with wildcards and/or exceptions), an action to trigger generation, an attempt to launch processes, access files, establish network connections, etc., prior actions including files touched, processes launched, network connections opened, etc.

As seen from FIG. 10, the user can specify one or more actions to be performed. Additionally, the user can also request a log of the action performed. The user can specify an action to be performed when a particular enforcement action occurs, which attempts certain actions. As an example, the data payload can be set as untrusted when an enforcement action such as terminate or deny occurs on applications in a selected class that target applications in a selected class and attempt specified actions. The specified actions can include, but are not limited to, access local configuration information, access security account manager, monitor media devices, trap keystrokes, access physical memory, download or invoke ActiveX controls, inject code into other applications, write memory owned by other applications, access system function from code executing in data or stack space, handle exceptions or invoke unusual system calls.

Figure 11:
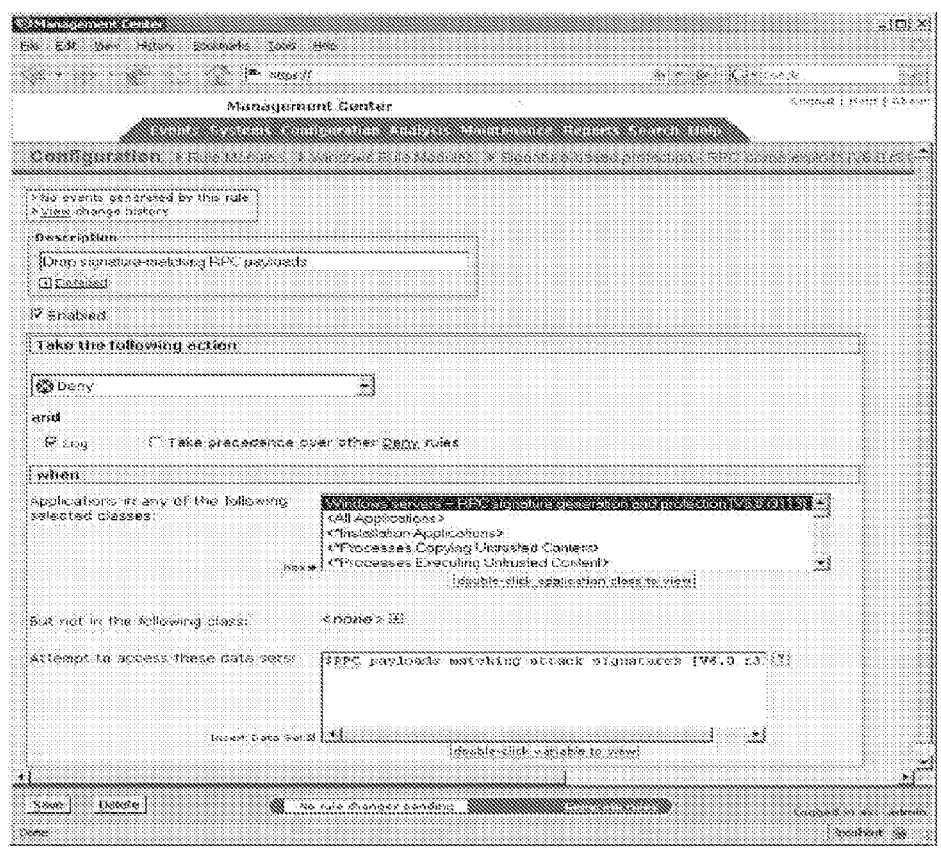
FIG. 11 illustrates an example GUI that enables a user to specify a filtering rule, in accordance with an aspect of the specification.

FIG. 11 illustrates an example screenshot 1100 of a GUI that can enable a user to specify a filtering rule, in accordance with an aspect of the specification. As an example, a user can specify one or more actions to be performed when a payload matches the signature. As seen in screenshot 1100, a filtering rule to drop signature matching RPC payloads can be defined. The user can specify an action to be taken when applications in a selected class attempt to access specific datasets. Although the screenshots illustrated in FIG. 10 and FIG. 11 depict a specific rule, it can be appreciated that most any rule can be set by a user employing the GUI.

Figure 12:
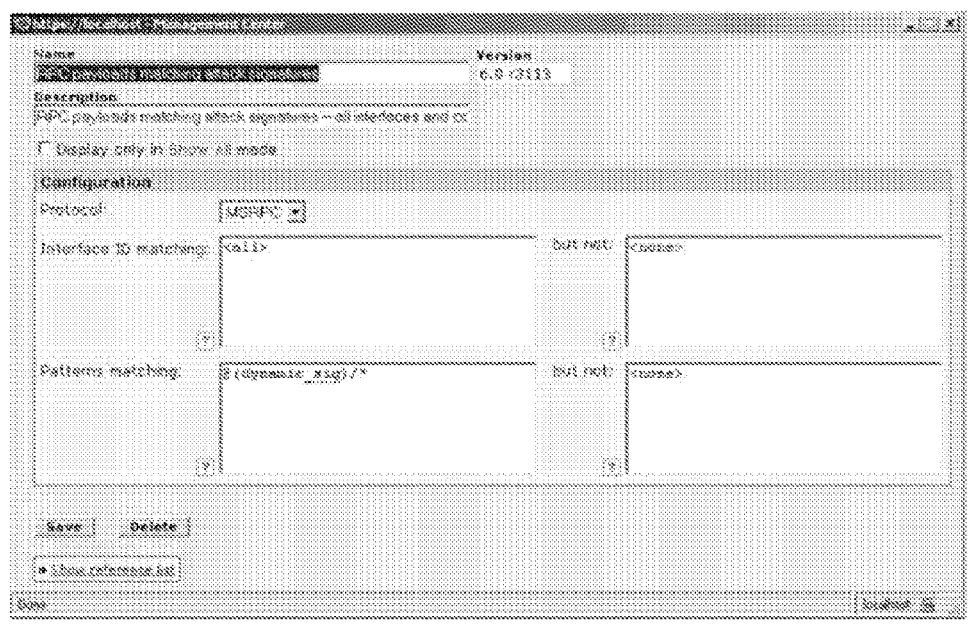
FIG. 12 illustrates example GUIs that determine datasets corresponding to a filtering rule, in accordance with an aspect of the innovation.
Figure 12:
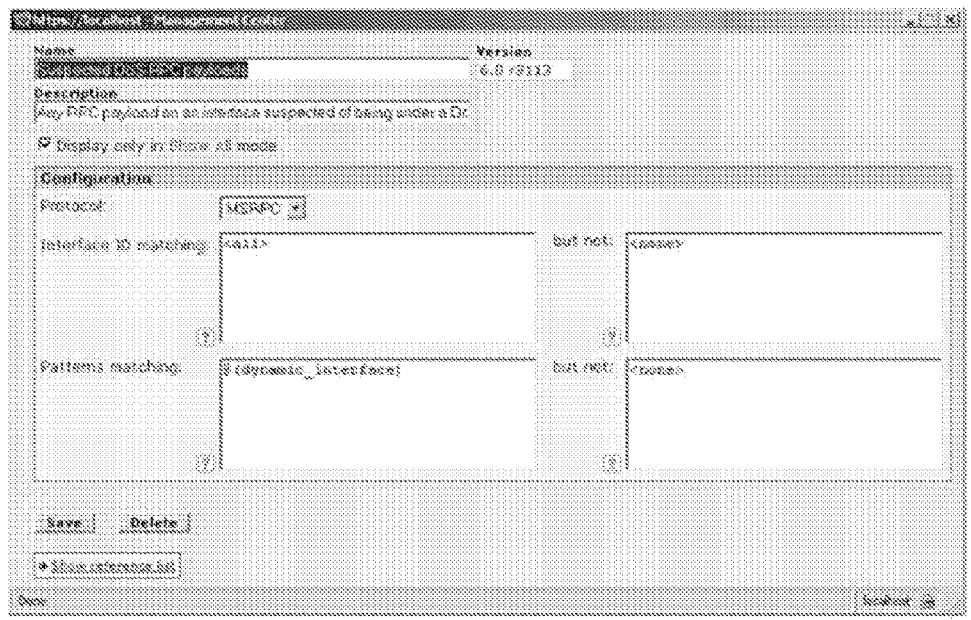

Referring to FIG. 12, there illustrated are example screenshots of a GUI that determine datasets corresponding to a filtering rule, in accordance with an aspect of the innovation. Screenshot 1202 illustrates a signature matching dataset whereas screenshot 1204 illustrates a DoS matching dataset. A user can specify a desired configuration and view a reference list based on the specification.

Figure 13:
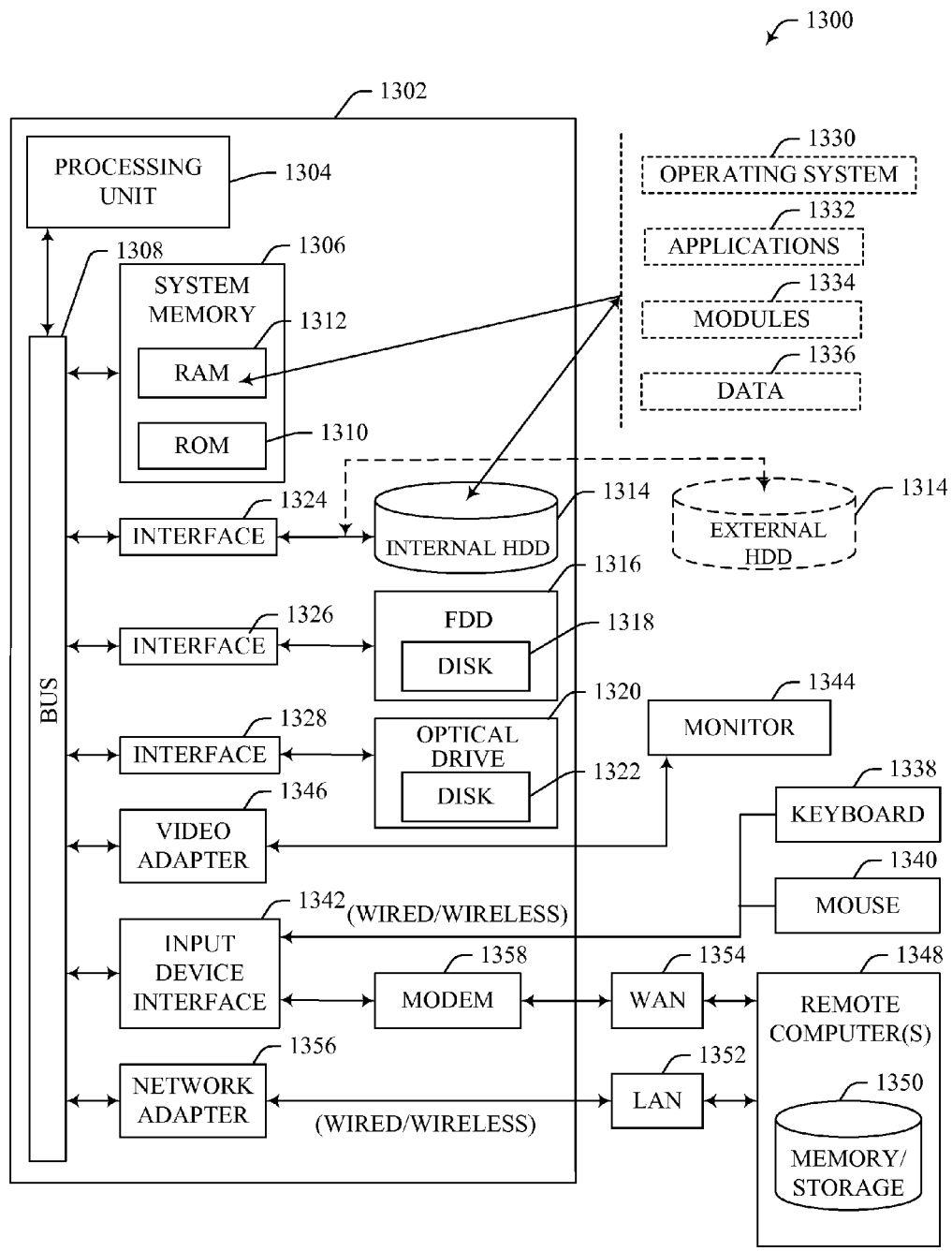
FIG. 13 illustrates a block diagram of a computer operable to execute the disclosed architecture.

Referring now to FIG. 13, there is illustrated a block diagram of a computer operable to execute the disclosed architecture of the system that can provide policy-driven automatic signature generation, refinement and confidence characterization. In order to provide additional context for various aspects of the subject innovation, FIG. 13 and the following discussion are intended to provide a brief, general description of a suitable computing environment 1300 in which the various aspects of the innovation can be implemented. While the innovation has been described above in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 13, the exemplary environment 1300 for implementing various aspects of the innovation includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures may also be employed as the processing unit 1304.

The system bus 1308 can be any of several types of bus structure that may further interconnect to a memory bus (with or without a memory controller), a peripheral bus, and a local bus using any of a variety of commercially available bus architectures. The system memory 1306 includes read-only memory (ROM) 1310 and random access memory (RAM) 1312. A basic input/output system (BIOS) is stored in a non-volatile memory 1310 such as ROM, EPROM, EEPROM, which BIOS contains the basic routines that help to transfer information between elements within the computer 1302, such as during start-up. The RAM 1312 can also include a high-speed RAM such as static RAM for caching data.

The computer 1302 further includes an internal hard disk drive (HDD) 1314 (e.g., EIDE, SATA), which internal hard disk drive 1314 may also be configured for external use in a suitable chassis (not shown), a magnetic floppy disk drive (FDD) 1316, (e.g., to read from or write to a removable diskette 1318) and an optical disk drive 1320, (e.g., reading a CD-ROM disk 1322 or, to read from or write to other high capacity optical media such as the DVD). The hard disk drive 1314, magnetic disk drive 1316 and optical disk drive 1320 can be connected to the system bus 1308 by a hard disk drive interface 1324, a magnetic disk drive interface 1326 and an optical drive interface 1328, respectively. The interface 1324 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1302, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the innovation.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. It is appreciated that the innovation can be implemented with various commercially available operating systems or combinations of operating systems.

A user can enter commands and information into the computer 1302 through one or more wired/wireless input devices, e.g., a keyboard 1338 and a pointing device, such as a mouse 1340. Other input devices (not shown) may include a microphone, an IR remote control, a joystick, a game pad, a stylus pen, touch screen, or the like. These and other input devices are often connected to the processing unit 1304 through an input device interface 1342 that is coupled to the system bus 1308, but can be connected by other interfaces, such as a parallel port, an IEEE 1394 serial port, a game port, a USB port, an IR interface, etc.

A monitor 1344 or other type of display device is also connected to the system bus 1308 via an interface, such as a video adapter 1346. In addition to the monitor 1344, a computer typically includes other peripheral output devices (not shown), such as speakers, printers, etc.

The computer 1302 may operate in a networked environment using logical connections via wired and/or wireless communications to one or more remote computers, such as a remote computer(s) 1348. The remote computer(s) 1348 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1350 is illustrated. The logical connections depicted include wired/wireless connectivity to a local area network (LAN) 1352 and/or larger networks, e.g., a wide area network (WAN) 1354. Such LAN and WAN networking environments are commonplace in offices and companies, and facilitate enterprise-wide computer networks, such as intranets, all of which may connect to a global communications network, e.g., the Internet.

When used in a LAN networking environment, the computer 1302 is connected to the local network 1352 through a wired and/or wireless communication network interface or adapter 1356. The adapter 1356 may facilitate wired or wireless communication to the LAN 1352, which may also include a wireless access point disposed thereon for communicating with the wireless adapter 1356.

When used in a WAN networking environment, the computer 1302 can include a modem 1358, or is connected to a communications server on the WAN 1354, or has other means for establishing communications over the WAN 1354, such as by way of the Internet. The modem 1358, which can be internal or external and a wired or wireless device, is connected to the system bus 1308 via the serial port interface 1342. In a networked environment, program modules depicted relative to the computer 1302, or portions thereof, can be stored in the remote memory/storage device 1350. It will be appreciated that the network connections shown are exemplary and other means of establishing a communications link between the computers can be used.

The computer 1302 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 14:
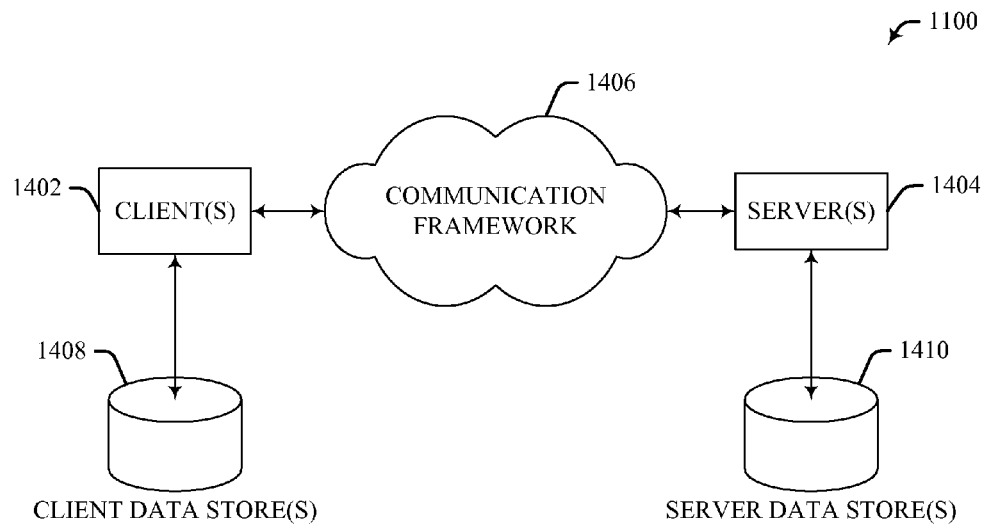
FIG. 14 illustrates a schematic block diagram of an exemplary computing environment in accordance with the subject innovation.

Referring now to FIG. 14, there is illustrated a schematic block diagram of an exemplary computing environment 1400 in accordance with the subject innovation. The system 1400 includes one or more client(s) 1402. The client(s) 1402 can be hardware and/or software (e.g., threads, processes, computing devices). The client(s) 1402 can house cookie(s) and/or associated contextual information by employing the innovation, for example.

The system 1400 also includes one or more server(s) 1404. The server(s) 1404 can also be hardware and/or software (e.g., threads, processes, computing devices). The servers 1404 can house threads to perform transformations by employing the innovation, for example. One possible communication between a client 1402 and a server 1404 can be in the form of a data packet adapted to be transmitted between two or more computer processes. The data packet may include a cookie and/or associated contextual information, for example. The system 1400 includes a communication framework 1406 (e.g., a global communication network such as the Internet) that can be employed to facilitate communications between the client(s) 1402 and the server(s) 1404.

Communications can be facilitated via a wired (including optical fiber) and/or wireless technology. The client(s) 1402 are operatively connected to one or more client data store(s) 1408 that can be employed to store information local to the client(s) 1402 (e.g., cookie(s) and/or associated contextual information). Similarly, the server(s) 1404 are operatively connected to one or more server data store(s) 1410 that can be employed to store information local to the servers 1404.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An anti-malware system, comprising:
a processing device comprising:
a payload monitoring component monitoring incoming payloads, detects an event that triggers a process of generating a signature based on the incoming payloads, and generates a rule request based on information associated with an incoming payload, the rule request employed to determine if a signature is to be generated for the incoming payloads after detecting the event and prior to generating the signature;
a policy defining component receiving one or more policies from a user, the one or more policies include at least one of a policy for signature generation or a policy for filtering incoming payloads;
a signature determining component comprising a signature-determining rules component comparing the rule request with the one of more policies to determine if the signature is to be generated, the signature determining component generating the signature for the incoming payloads based at least in part on the rule request and the one or more policies, the signature employed to identify malware, the signature-determining rules component further attaching metadata to the generated signature, the metadata including a confidence metric associated with the generated signature, wherein the confidence metric for a particular signature indicates a likelihood that a payload triggering the particular signature is malware and the metadata facilitates identification and separation of a particular malware attack from other malware attacks; and
a signature verifying component sending the generated signature and its associated metadata to the user for approval of the generated signature based on the confidence metric.

2. The system of claim 1, wherein a signature is automatically generated if the rule request matches a set-payload-untrusted rule or the rule request does not match a set-payload-trusted rule, the set-payload-untrusted rule and set-payload-trusted rule defined in the one or more policies.

3. The system of claim 1, further comprising a filtering component identifying malware based at least in part on a filtering rule that is defined at least in part by the one or more policies.

4. The system of claim 1, further comprising a Denial-of-Service (DoS) prevention component preventing DoS attacks based at least in part on the frequency of signature-generation attempts.

5. The system of claim 1, further comprising a graphical user interface (GUI) that enables a user to specify the policy.

6. A method for identifying malware in a network, comprising:
receiving, from a user, one or more policies, the one or more policies include at least one of a policy for signature generation or a policy for filtering incoming payloads;
generating a rule request based on information associated with an incoming payload on detection of an event that triggers signature generation, the rule request is employed to determine if a signature is to be generated for the incoming payloads after detection of the event and prior to generating the signature;
comparing a rule request associated with an incoming payload with the one or more policies to determine whether a signature is to be generated for the incoming payload;

triggering signature generation based at least in part on the rule request and the one or more specified policies, the generated signature employed to identify malware;

attaching metadata to the generated signature, the metadata including a confidence metric associated with the generated signature, wherein the confidence metric for a particular signature indicates a likelihood that a payload triggering the particular signature is malware and the metadata facilitates identification and separation of a particular malware attack from other malware attacks; and sending the generated signature and its associated metadata to the user for approval of the generated signature based on the confidence metric.

7. The method of claim 6, further comprising automatically generating a signature for the incoming payload if the rule request matches a set-payload-untrusted rule defined in the one or more policies.

8. The method of claim 7, further comprising identifying malware based at least in part on a filtering rule that is defined at least in part by the one or more policies.

9. The method of claim 6, further comprising employing the one or more policies to define at least one of a signature generating rule, a filtering rule or a DoS (Denial of Service) prevention rule.

10. The method of claim 6, further comprising mitigating Denial-of-Service (DoS) attacks based at least in part on a frequency of signature-generation attempts.

11. A system that facilitates identification of malware, comprising:

a policy defining component receiving, from a user, at least one policy, the at least one policy includes at least one of a policy for signature generation or a policy for filtering incoming payloads;

a signature-determining rules component comparing a rule request associated with an incoming payload with the at least one policy to determine whether a signature is to be generated for the incoming payload after detecting an event that triggers a process of generating the signature and prior to generating the signature, the signature-determining rules component further attaching metadata to the generated signature, the metadata including a confidence metric associated with the general signature, wherein the confidence metric for a particular signature indicates a likelihood that a payload triggering the particular signature is malware and the metadata facilitates identification and separation of a particular malware attack from other malware attacks;

a signature determining component triggering signature generation based at least in part on the rule request and the at least one specified policy, the generated signature employed to identify malware; and a signature verifying component sending the generated signature and its associated metadata to the user for approval of the generated signature based on the confidence metric.

12. The system of claim 11, further comprising, a component automatically generating a signature for the incoming payload if the rule request matches a set-payload-untrusted rule defined in the at least one policy.

13. The system of claim 11, further comprising, a component identifying malware based at least in part on at least one of a filtering rule or a generated signature.

14. The system of claim 11, further comprising, a component determining a frequency of signature-generation attempts to mitigate Denial-of-Service (DoS) attacks.

* * * * *